United States Patent [19]

Sheppard

[11] 4,148,374
[45] Apr. 10, 1979

[54] UNIVERSAL LOCATING PIN FOR AXLE MOUNTED POWER STEERING

[76] Inventor: Richard H. Sheppard, Hanover, Pa. 17331

[21] Appl. No.: 833,180

[22] Filed: Sep. 14, 1977

[51] Int. Cl.$^2$ .............................................. B62D 5/06
[52] U.S. Cl. ...................................... 180/163; 85/5 B
[58] Field of Search ..................... 180/163; 85/5 B, 83

[56] References Cited

U.S. PATENT DOCUMENTS

| 1,918,438 | 7/1933 | Unger | 85/5 B |
|---|---|---|---|
| 1,926,798 | 9/1933 | Baumbach | 85/5 B |
| 2,822,986 | 2/1958 | Schreier | 85/5 B X |
| 2,901,804 | 9/1959 | Williams | 85/5 B X |
| 3,970,166 | 7/1976 | Sheppard | 180/163 |

Primary Examiner—Joseph F. Peters, Jr.
Assistant Examiner—R. Schrecengost
Attorney, Agent, or Firm—Lowe, King, Price & Becker

[57] ABSTRACT

Axle mounting of integral power steering is provided by a central adjustable locating pin that prevents lateral movement of the mounting base plate of the steering gear with respect to the axle. The locating pin includes an opening adjacent the slightly oversized hole in the vehicle axle with radially extensible ball bearings positioned in the opening. The bearings are spaced around the pin to provide engagement against the periphery of the wall of the hole. The pin is accurately positioned in the base plate of the mounting bracket by employing a tight fit in a reamed mounting aperture in the bracket. The locating pin includes a central bore having a cam screw including a frusto-conical section on the lower end to force the ball bearings outwardly against the wall of the hole in the axle. The opening for the bearings is filled with high viscosity grease to hold the ball bearings in position during mounting and for lubrication. A removable cap fits over the lower end of the pin to protect the ball bearings prior to mounting.

7 Claims, 5 Drawing Figures

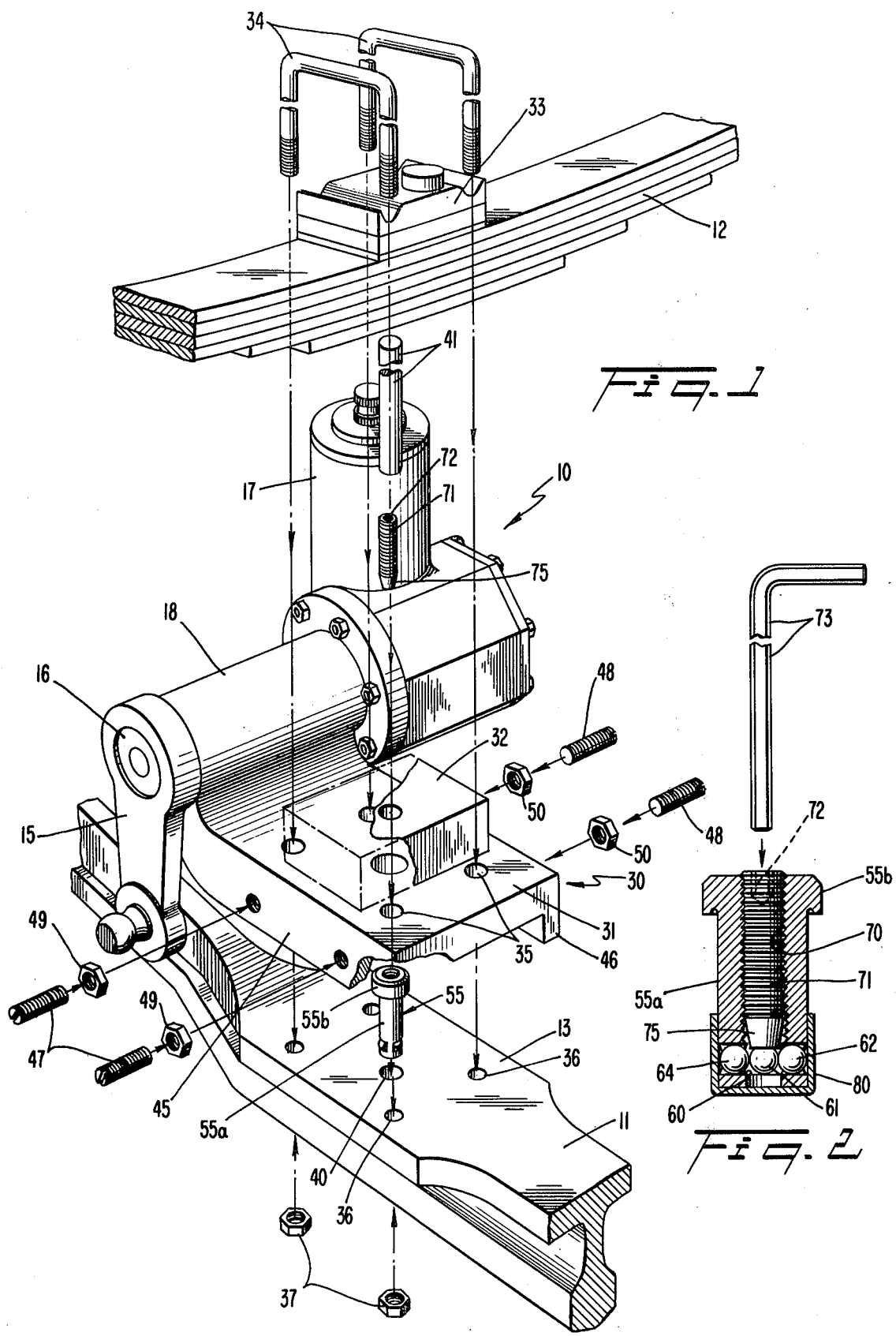

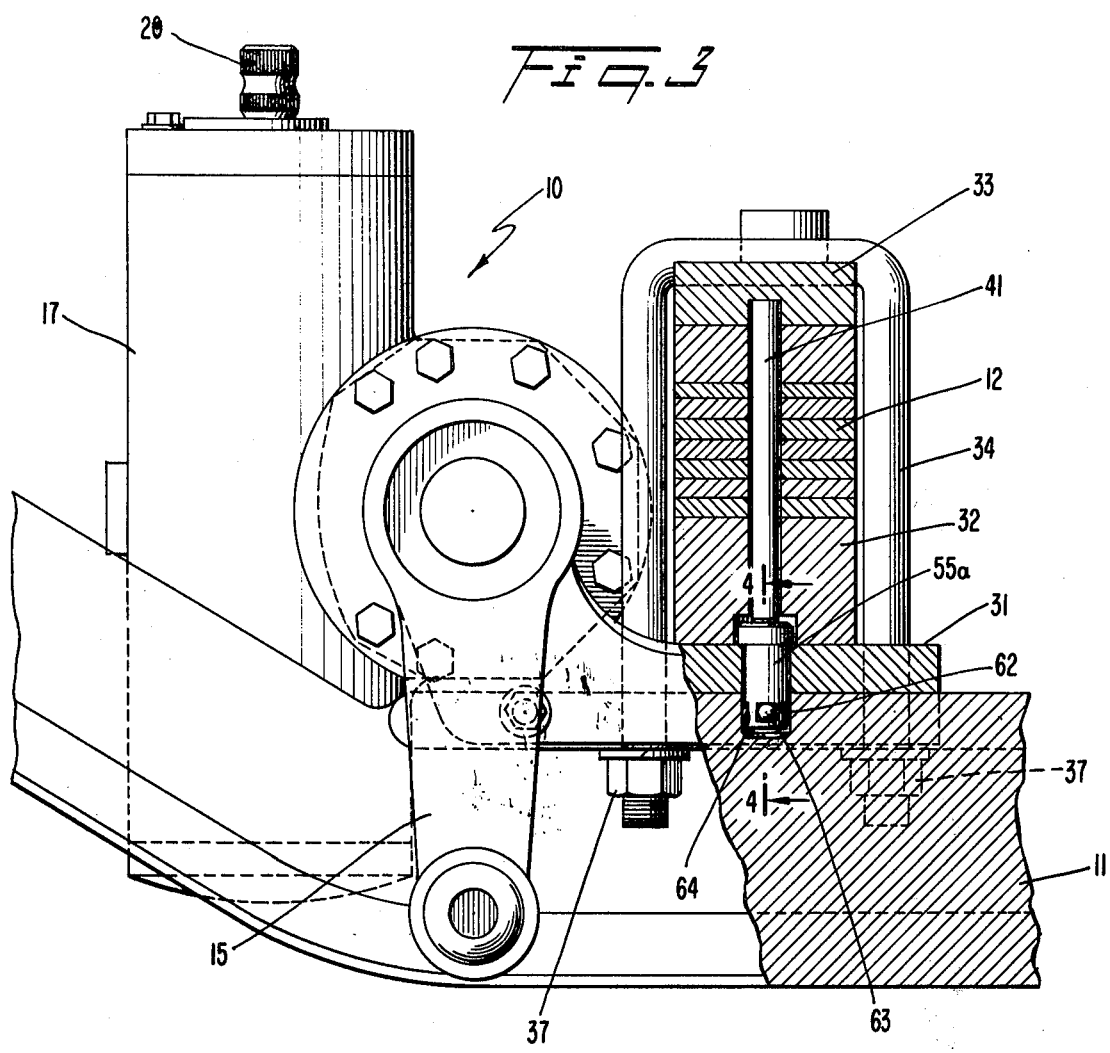
Fig. 3
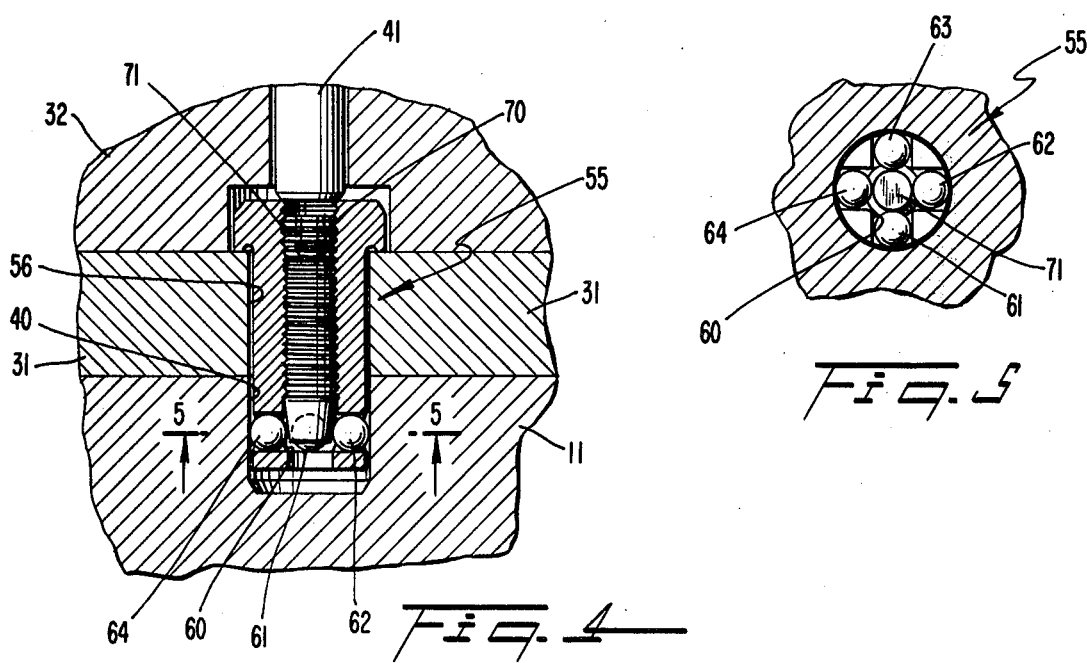
Fig. 4
Fig. 5

UNIVERSAL LOCATING PIN FOR AXLE MOUNTED POWER STEERING

FIELD OF THE INVENTION

The present invention relates to improvements in mounting of power steering, and more particularly, to an improvement of my previous mounting arrangement for a power steering gear unit on the axle of a vehicle.

BACKGROUND OF THE INVENTION

The advantages of mounting a power steering gear unit on the axle of a vehicle have been known to those active in the field for several years. With the power steering unit mounted on the axle, the steering linkages do not have to accommodate relative movement between the wheels and the frame. As the vehicle negotiates bumps in the road, the power steering unit simply moves as an integral part of the entire steering linkage system carried by the axle. The constant change in angle of the drag link and the consequent changing of steering forces that previously have been dealt with are now eliminated giving a definite edge in operability efficiency and ease of maintenance.

With dual steering, the advantages of axle mounting are even more prevalent. In a dual axle mounted system, the chance of dual force mismatch or "fighting" is eliminated. Axle mounting will provide greater incentive for vehical manufacturers, especially of large trucks, to move to dual steering.

Recent years has brought to the industry the reliable extensible and flexible connection between the steering shaft and the input shaft of the power steering unit. This development further opens the door to axle mounting on vehicles and has provided an impetus to develop a truly efficient dual steering.

At the present time, the need for added improvement in the system lies in the manner of mounting and locking the steering gear on the axle. The locking is critical since the reaction and shock forces between the steering gear and the axle are substantial, especially in large vehicles, such as heavy duty trucks, and all chance of movement or looseness must be eliminated.

My previous basic concept for *AXLE MOUNTING OF INTEGRAL POWER STEERING GEAR*, U.S. Pat. No. 3,970,166, issued July 20, 1976, taught the art the use of an integral locating pin and set screws and/or additional strategically located pins to resist the forces of reaction by providing direct and positive accommodation, both in the lateral, as well as the pivotal, directions. This successful axle mounting of an integral power steering gear included the concept of having the manufacturer ream a specially sized hole in the axle to receive a locating pin. This pin is designed to have a locational interference fit with the hole and thus holds the steering gear against any lateral movement.

My prior invention has been accepted in the industry as a great improvement over the previous locking arrangements wherein the forces of reaction of the steering gear unit are transmitted fully through the U-bolts with the U-bolts tending to develop looseness and eventually potential failure.

Because the manufacturer was required to provide a precision reamed hole in the axle, additional manufacturing costs are encountered. A savings, especially where the savings is in the area of eliminating the need for precision work can be substantial in terms of overall production of vehicles, such as trucks.

Furthermore I have discovered that in the process of installation, there is room for improved results in assembling the parts of the workers since the task of assembling interference fit parts is sometimes tedious and thus time consuming. My reasoning led me to the conclusion that a locating pin that is adjustable over a range of hole sizes would not only do away with the requirement for a precision reamed hole, but could greatly improve the installation process by the manufacturer. Another clear advantage that naturally follows would be that several different size pins for different makes and models of axles would not be required since one size adjustable pin would fit a wide range.

OBJECTIVES OF THE INVENTION

It is thus one object of the present invention to provide an improved power steering system with pin assembly for locating the support bracket for a power steering gear unit on a vehicle axle without the need for a precision reamed locating hole.

It is another object of the present invention to provide a power steering assembly with an adjustable locating pin adapted to pass through the mounting bracket and adjustably locate the assembly on the vehicle axle.

It is still another object of the present invention to provide a locating pin assembly for power steering having an opening with adjustable expandable means in the opening to engage the hole in the vehicle axle.

It is still another object of the present invention to provide an axle mounting pin assembly with infinitely adjustable expanding means to provide accurate location and locking of a power steering gear.

Another object is to overcome the shortcomings of previous mounting arrangements as identified above.

BRIEF DESCRIPTION OF THE INVENTION

This invention is an improvement of my previous invention covered in the U.S. Pat. No. 3,970,166. An adjustable locating pin with self-centering radially outwardly extending bearings engage a non-precision drilled hole in the axle. The improvement renders the process of installation of steering gears not only lower in cost but also decidedly easier for the manufacturer of the vehicle.

The assembly includes a pin adapted to pass through the mounting bracket of the gear and into a slightly oversized hole in the upper face of the axle. Adjacent the lower end of the pin, expanding means are provided. In the preferred embodiment, this takes the form of ball bearings spaced around the pin and urged outwardly to engage the wall of the hole. The bearings are mounted in an opening in the lower end of the pin and are forced in an outer expanded or extended position by a cam in the form of a screw threadedly engaging a central bore of the locating pin. The cam has a frusto-conical section at its lower end communicating with the opening and engaging the bearings positioned at 90° intervals around the periphery of the pin. By downward adjustment of the screw, the bearings are self-adjusting so as to provide a centered position of the bracket when tightened. The adjustable locating pin can accommodate a drilled hole in the axle over a range of approximately ¾"–1" diameter.

The opening in the pin is packed with high viscosity grease in order to hold the bearings in position during mounting and for lubrication to prevent corrosion. A removable cap, formed of suitable plastic, is designed to fit over the end of said pin adjacent the expanding means to protect the same prior to mounting.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 1 is an exploded perspective view showing the bracket assembly and power steering gear unit with the improved adjustable locating pin along with the spring and axle of the vehicle;

FIG. 2 is a cross-sectional view of the adjustable locating pin prior to mounting and illustrating the tool for operating the expandable means of the pin;

FIG. 3 is a view partially in cross section showing the pin installed on the axle of a vehicle with the power steering gear unit;

FIG. 4 is a cross-sectional view taken along line 4—4 of FIG. 3 showing the inside details of the locating pin; and FIG. 5 is a cross-sectional view across the end of the locating pin showing the radial positioning of the ball bearings and the equalized engagement with the mounting hole in the axle.

DETAILED DESCRIPTION OF THE PREFERRED EMBODIMENT

With reference now to the composite exploded view of the system shown in FIG. 1, an integral power steering gear unit 10 is to be mounted on a conventional front axle 11 of a truck or similar vehicle. A partial showing of a leaf spring 12 is included. The particular steering gear unit 10 is shown positioned for mounting on the conventional spring mounting pad 13, which comprises a widened platform area on the axle 11.

The steering unit 10 includes an output crank 15 suitably fixed to the end of output shaft 16. A drag link (not shown) is connected in a conventional way to the ball on the end of the crank 15 to transmit the steering action to the wheels (not shown) adjacent the ends of the axle 11.

The cylinder housing 17 for the power steering gear unit is positioned vertically in the setup of the present invention, as best shown in FIG. 3. Bearing housing 18 positions the output shaft 16 in a horizontal plane.

Input shaft 20 of the unit 10 is adapted to be connected to the steering shaft of the vehicle that is operated by the steering wheel. Any conventional extensible and flexible coupling (not shown) is to be provided for this connection in use.

The power steering gear unit 10 is basically of the same design as used on trucks where the unit is to be mounted on the frame. The basic mechanical design change in the steering unit itself is the extended length of the output shaft and mounting of the entire unit through the bearing housing 18, which forms an integral part of mounting bracket 30. Base plate 31 of the bracket 30 supports the housing 18 on the pad 13.

Depending on the particular model truck or other vehicle upon which the power steering gear unit 10 is to be mounted, there may be provided spacer blocks 32, 33 on opposite sides of the spring 12. Conventional U-bolts 34 extend around the spring 12 and through apertures 35 in the base plate 31 and corresponding apertures 36 in the pad 13 of the axle 11. The U-bolts 34 serve to hold the assembly together but are not relied upon to resist the reaction forces as was previously the case before my prior invention disclosed and claimed in U.S. Pat. No. 3,970,166. Nuts 37 are tightened on the ends of U-bolts 34 when the assembly has been made, as best shown in FIG. 3.

A single locating hole 40 is drilled slightly oversized in the center of the pad 13 on the axle 11. In my prior patent, this hole was designed to be reamed to a precision fit with the locating pin. However, with the improvement of my present invention, this hole need be drilled simply to a standard opening, such as 13/16 inches, as provided by most truck manufacturers. No longer is the size of the hole a critical aspect of providing the location of the power steering gear unit 10 on the axle 11. In fact, the hole may be drilled from any size, without critical tolerance limitations between approximately ¾" to 1" in size. This range of the locating hole will take care of most makes and models.

Previously, the hole 40 was adapted to receive positioning pin 41 for the leaves of the spring 12. In my arrangement, the same pin 41 is used through the spring 12 and blocks 32, 33 in order to keep the leaves of the spring from shifting.

The base plate 31 is provided with front and rear depending flanges 45, 46 into which are drilled and tapped apertures for receiving a plurality of locking set screws 47, 48, respectively. These set screws serve to engage the corresponding front and rear edge of the pad 13 to prevent pivotal movement of the base plate 31. Thus, once the locating pin, which will presently be described in detail, is positioned in the locating hole 40, the set screws 47, 48 are simply tightened down to the prescribed torque and are firmly held in position by the locking nuts 49, 50. The locking set screws 47, 48 are not relied upon for any lateral (side-to-side or front-to-back) positioning function of the base plate 31.

As best shown in FIGS. 1 and 3, my new locating pin assembly, generally designated by the reference numeral 55 is provided and adapted to be positioned in the locating hole 40. The lower body portion 55a of the locating pin 55 is designed to be slightly smaller than the receiving hole 40. Head 55b of the pin 55 rests on the face of the plate 31 and within a recess of the block 32 (see FIG. 3). The fit between the parts should be a loose fit so that the parts are easily assembled by the assembly line worker of the vehicle manufacturer. The parts do not have to be a locational interference fit, as was previously preferred.

The body portion 55a of the pin 55 is designed to have a tight fit in a reamed mounting aperture 56 within the base plate 31 of the mounting bracket 30. This aperture may be accurately machined since it is a part that is machined by the power steering manufacturer, and can thus be accurately controlled. This tight fit prevents the base plate 31 from shifting with respect to the pin 55.

According to an important aspect of my invention, the locating pin 55 is provided with an opening 60 in the lower end. The opening 60 includes four radially extending passages, as best shown in FIG. 5, positioned at 90° with respect to each other. Within the passages are positioned ball bearings 61-64. Although four bearings have been shown, it is understood that more (5 or more) or less (3) equally spaced bearings could be employed within the broadest aspects of the present invention.

The outer side of bearings 61-64 are designed to engage the wall of the hole 40 so as to provide the required locating function. Since the hole 40 is slightly oversized, the bearings 61-64 when activated extend out beyond the outer periphery of the body of the pin 55 (see, for example, FIG. 5). This design allows the pin 55 to be easily inserted into the hole 40 without fear of breaking the pin or having to drive the pin forcibly into position. As the bearings 61-64 extend radially outward, thereby forming broadly an expanding means, the wall is engaged at four spaced points. The bracket 30 reaches a self-equalizing position, that is desirable for the locating function.

The pin 55 is provided with a central bore 70 with a cam screw 71 threadedly engaged in the bore. The screw 71 is provided with a tool receiving recess 72 to be engaged by a conventional Allen wrench 73 (FIG. 2).

At the lower end of the cam screw 71 is provided a frusto-conical cam section 75 which is positioned in an operative position adjacent the opening 60 and positioned for engagement with the bearings 61-64. As the cam screw 71 is actuated by screwing down within the pin 55, the cam section 75 engages the inner side of each of the balls 61-64 and urges them equally in an outward direction. The cam surface acting with equal force against the bearings 61-64 provides the self-equalizing or self-centering action for the pin 55. Thus, as the cam screw 71 is driven into final position with the required torque, the entire bracket 30 is centered, located and locked into position against any lateral movement, either side-to-side or front-to-back. The final pivotal locking of the bracket 30 will occur by adjusting the set screws 47, 48 and locking them with the nuts 49, 50, respectively.

The opening 60 is filled with high viscosity grease so that the bearings 61-64 are retained within the opening during installation. The grease provides lubrication and prevents corrosion when the installation has been completed. A protective cap fabricated of plastic or the like is provided over the end of the pin 55 prior to commencing the installing procedure.

In summary, a locating pin assembly has been provided wherein the axle mounting of a power steering gear can be effected without the need for a precision reamed hole in the axle 11. The locating pin 55 includes an opening 60 with radially extensible bearings 61-64 that are urged into a self-equalizing position by the cam screw 71. The installation process is greatly streamlined by this innovation.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

What is claimed is:

1. In combination, an adjustable pin assembly and a slightly oversized and smooth bore hole in a vehicle axle receiving said pin assembly axle for locating a bracket for a power steering gear unit on the axle comprising
 a pin having a central opening and adapted to pass through said bracket;
 means for accurately positioning said pin with respect to said bracket; and
 adjustable expanding means extending substantially radially outward from said central opening to engage said oversized hole at any position therealong; whereby said bracket may be located and centrally fixed with respect to a lateral position on said axle without having a precision reamed hole in said axle.

2. The conbination of claim 1 wherein there is further provided
 a central bore in said pin communicating with said opening;
 a cam extending axially along said central bore;
 said cam engaging said expanding means to force the same outwardly against the wall of said hole.

3. The combination of claim 2 wherein said cam is formed by a screw extending along said central bore and having a frusto-conical section on the end adjacent said opening.

4. The combination of claim 1 wherein said positioning means comprises a reamed mounting aperture in said bracket, said pin having a tight fit in said aperture.

5. The combination of claim 3 wherein said expanding means comprises
 a plurality of extensible ball bearings spaced around said sleeve,
 said bearings being engaged on the inner side by said frusto-conical cam section and forced against said wall on the outer side when extended.

6. The combination of claim 1 wherein said central opening is filled with high viscosity grease adjacent said expanding means to hold the same in position during mounting and for lubrication.

7. The combination of claim 6 wherein there is provided a removable cap to fit over said pin adjacent said expanding means to protect the same prior to mounting.

* * * * *